US009654554B2

(12) United States Patent
Bucher et al.

(10) Patent No.: US 9,654,554 B2
(45) Date of Patent: May 16, 2017

(54) SEAMLESS SCALING OF MULTIPLE APPLIANCES

(75) Inventors: Tim Bucher, Los Altos, CA (US); Tim Sullivan, Portola Valley, CA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 1940 days.

(21) Appl. No.: 10/935,930

(22) Filed: Sep. 8, 2004

(65) Prior Publication Data

US 2005/0060700 A1 Mar. 17, 2005

Related U.S. Application Data

(60) Provisional application No. 60/502,746, filed on Sep. 12, 2003.

(51) Int. Cl.
*G06F 15/16* (2006.01)
*H04L 29/08* (2006.01)
*H04W 24/02* (2009.01)

(52) U.S. Cl.
CPC ...... *H04L 67/1095* (2013.01); *H04L 67/1044* (2013.01); *H04W 24/02* (2013.01)

(58) Field of Classification Search
CPC .................................................. H04L 67/1044
USPC .................................................. 709/223, 224
See application file for complete search history.

(56) References Cited

U.S. PATENT DOCUMENTS

| | | | |
|---|---|---|---|
| 5,905,859 A * | 5/1999 | Holloway et al. ............... | 726/22 |
| 6,038,624 A | 3/2000 | Chan et al. | |
| 6,122,639 A * | 9/2000 | Babu et al. ............... | 707/103 R |
| 6,314,326 B1 | 11/2001 | Fuchu | |
| 6,420,961 B1 * | 7/2002 | Bates et al. .................. | 340/10.1 |
| 6,449,514 B1 | 9/2002 | Natsubori et al. | |
| 6,484,226 B1 | 11/2002 | Wallach et al. | |
| 7,200,651 B1 * | 4/2007 | Niemi .......................... | 709/223 |

* cited by examiner

*Primary Examiner* — Adnan Mirza
(74) *Attorney, Agent, or Firm* — Hotzel Patel Drennan

(57) ABSTRACT

A method of seamlessly scaling multiple network appliances in an appliance based network. The disclosed method allows a network to automatically utilize the resources of one or more additional appliances without performing extensive installation or calibration routines. In addition, the method includes assigning a new appliance a particular role and sub-role designation such that it is used in the most effective manner to serve the particular needs of the network in which the new appliance is being connected. The new appliance can be used as an expansion appliance to provide additional data storage capabilities, a mirroring appliance, which provides backup data storage capabilities, and/or a range extension appliance that extends the wireless communication range of the existing appliance.

18 Claims, 3 Drawing Sheets

SEAMLESS SCALING OF MULTIPLE APPLIANCES

CROSS-REFERENCE TO RELATED APPLICATIONS

This application claims the benefit of U.S. Provisional Application Ser. No. 60/502,746, filed Sep. 12, 2003, which is incorporated herein by reference.

BACKGROUND OF THE INVENTION

1. The Field of the Invention

This invention relates generally to the field of computer networking and data storage. In particular, embodiments of the present invention relate to a method of seamlessly scaling multiple appliances in a network.

2. The Relevant Technology

Computer and data communications networks continue to proliferate due to declining costs, increasing performance of computer and networking equipment, and increasing demand for communication bandwidth. Communications networks, including wide area networks ("WANs") and local area networks ("LANs"), allow increased productivity and utilization of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

One particular problem associated with networks involves scaling or expanding a network in a manner to accommodate higher demands. For example, a small business may initially install a network capable of providing service to, for example, between one and one hundred computers. The small business may then grow to twice its original size and exceed the capabilities of its original network. Most networks can easily be scaled to accommodate more devices by adding additional servers or routers to ensure that data signals are efficiently transferred between the devices. In conventional wired networks, new devices must be given an identification number and logged into a central server before other devices are capable of communicating with the new device. Unfortunately, this process generally involves extensive calibration and manual wiring of the new devices into the existing network.

In addition, there may be compatibility problems with installing newly manufactured products into an existing network using outdated or discontinued networking devices. An unsophisticated user is thereby forced to either hire an outside professional to perform the necessary procedures or endure the problems associated with exceeding the capacity of their original network parameters. There has been a recent movement in networking software towards supporting a seamless or plug and play process, in which a new device plugged into a network is automatically identified and configured to operate in the network. Yet, even this solution still requires a user to properly connect a new device into the correct location. For example, in an Ethernet network it may be necessary to install an additional hub to support more devices or clients. The hub can be connected to either the server directly or daisy chained off of an existing hub but it cannot simply be connected to one of the clients. Therefore, the step of physically connecting the new hub in the proper location still requires a user to possess a certain level of sophistication.

One effort to solve the problem of scaling involves wireless data networks. Wireless devices are generally able to automatically detect new devices and log them into the network. For example, in an IEEE 802.11 based network, a new laptop could be brought into range and immediately be connected to the network. Even in wireless networks, this automatic expansion process is generally not available for network backbone components such as servers and hubs. The components must be properly calibrated in order to be utilized. For example, if an additional server is added to a single server wireless network, it must be configured to share in the processing performed by the existing server.

BRIEF SUMMARY OF EMBODIMENTS OF THE INVENTION

These and other problems in the prior art are addressed by embodiments of the present invention, which relates to a method of seamlessly scaling multiple appliances in an appliance based network. The disclosed method allows a network to automatically utilize the resources of one or more additional appliances without performing extensive installation or calibration routines. In addition, the method includes assigning a new appliance a particular role and sub-role designation such that it is used in the most effective manner to serve the particular needs of the network in which the new appliance is being connected.

The method includes configuring all appliances to automatically initiate a communication sequence upon being connected to an electrical power source. First, the newly powered appliance transmits a identification signal including the identification of the newly powered appliance. This initial transmission is sent to inform other appliances of the identification of the new appliance in addition to determining whether there are any other existing appliances in the network. An existing appliance then transmits an identification response to the newly powered appliance. The identification response informs the newly powered appliance of the presence and identity of the existing appliance. Upon learning that another appliance already exists in the network, the newly powered appliance automatically assumes the role of slave. The newly powered appliance then sends an initial designation request to the existing appliance to request a specific sub-role designation. An appliance designated as a slave can have a sub-role designation including one or more sub-roles such as mirroring, expansion, and/or range extension. The existing appliance then transmits a designation request on to a peripheral computer that is designated as the network administrator of the network. The user of the peripheral computer inputs the appropriate sub-role designation for the newly powered appliance. The sub-role designation is then transferred to the newly powered appliance either directly or indirectly through the existing appliance via a designation response. This communication sequence is performed automatically whenever a new appliance is connected to a power source.

In addition, a method is disclosed that includes the analytical sequence that a master appliance uses in an appliance based network to determine where to store data in a multi-appliance scenario. The method includes initially determining whether a first criterion has been satisfied indicating that the data contents from one or more peripheral computers should be stored on one or more appliances. Once the first criterion is satisfied, the master appliance analyzes whether there are multiple appliances in the network. If there is only one appliance, the master appliance simply stores the data content of the peripheral computers on a storage device within the master itself. If there are multiple appliances within the appliance based network, the master proceeds to inquire as to whether there is at least one mirroring slave appliance. If there is a mirroring slave appliance in the network, the master will again store the entire data content of the peripheral computers on the storage device within the master appliance and then simply mirror the contents of the master appliance's storage device onto the storage device within a mirroring slave appliance.

If there are no mirroring slave appliances, the master will proceed to inquire as to whether there is at least one expansion slave appliance. If there is an expansion slave appliance in the network, the master appliance will store the data content of the peripheral computers on either the storage device within the master appliance or the storage device within the slave appliance depending on a second criterion. The second criterion simply instructs the master appliance how to partition the data segments within the data content between the different storage devices.

The present method provides numerous advantages over conventional systems. Most existing networks require complex calibrations and manual connection routines to scale up or expand an existing network. The present method discloses a seamless system in which an appliance automatically performs all of the necessary calibration routines in order to be incorporated into an existing appliance based network. Likewise, in a conventional network scenario, if a user is not sophisticated enough to properly expand an existing network they are forced to hire and pay a professional to perform the necessary steps. In addition, because of the complexity of the steps necessary to expand most networks, it is unlikely that the expansion will be performed in the manner most efficient for the existing network. In contrast, the present method automatically analyzes the existing network and configures the new appliance to take on a specific role designation in accordance with the analysis. In addition, the present method includes automatically requesting information from a network administrator as to the proper sub-role of a new appliance. These steps ensure that a new appliance is properly configured in the most optimum manner possible.

The foregoing, together with other features and advantages of the present invention, will become more apparent when referred to the following specification, claims and accompanying drawings.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to the drawings to describe presently preferred embodiments of the invention. It is to be understood that the drawings are diagrammatic and schematic representations of the presently preferred embodiments, and are not limiting of the present invention, nor are they necessarily drawn to scale.

In general the present invention relates to a method of seamlessly scaling multiple appliances in an appliance based network. The disclosed method allows a network to automatically utilize the resources of one or more additional appliances without performing extensive installation or calibration routines. In addition, the method includes assigning a new appliance a particular role and sub-role designation such that it is used in the most effective manner to serve the particular needs of the network in which the new appliance is being connected.

I. Exemplary Network Environment

Figure 1:
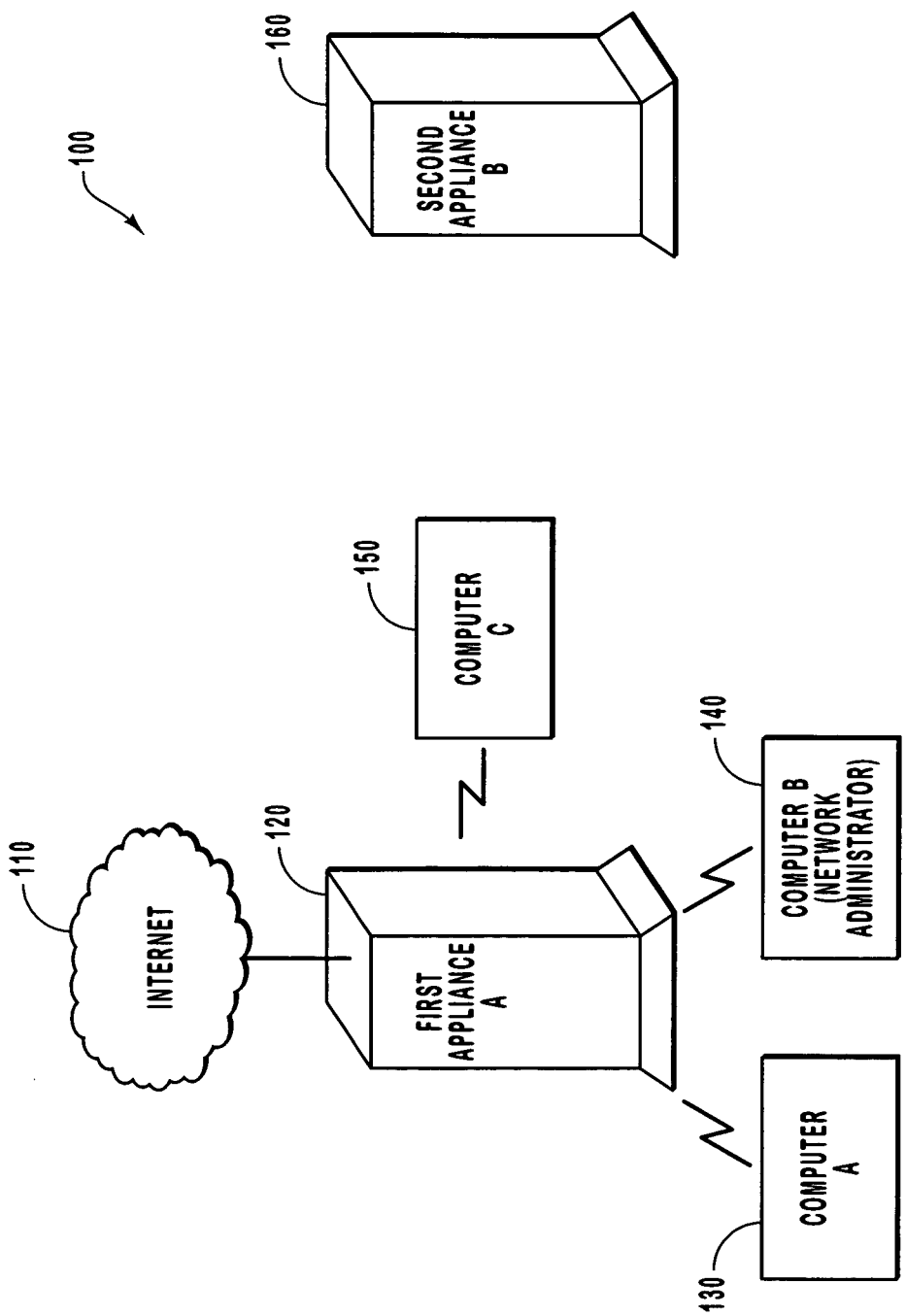
FIG. 1 illustrates a functional block diagram of a distributed appliance based wireless networking environment configured to implement one embodiment of the present invention to enable the seamless scaling of an additional appliance into the network.

Reference is initially made to FIG. 1, which illustrates a functional block diagram of a distributed appliance-based networking environment, designated generally at 100. An appliance based networking environment utilizes an appliance to perform various services for the computers in the network, such as by operating as a router and an internet gateway to distribute data throughout the network or by providing redundant data storage services. An appliance is a computer device that includes hardware devices and software modules. In particular, all appliances include a processor that executes the routines in the software based modules. In addition to modules that control the router and gateway functions of the appliance, the appliance also includes modules that perform data storage and network interfacing. The gateway function or module distributes data between the peripheral computers connected to the appliance and the internet. The router function or module distributes data between each of the peripheral computers connected to the appliance. The data storage module or function stores data from one or more of the peripheral computers. The data stored on the appliance can be used for any purpose such as backup, expansion, or collaboration, both within the local network illustrated in FIG. 1 and within a large area network that includes remote computers connected to the appliance via the internet. The network interfacing module or function of the appliance enables the appliance to exchange data with the peripheral computers connected to the appliance. All of the other modules in the appliance utilize the network interface module in order to communicate with the peripheral computers.

The distributed appliance based networking environment 100 includes a first appliance 120 (i.e., an existing network appliance) connected to three peripheral computers A 130, B 140, and C 150. The first appliance is defined as an existing networked appliance that is capable of communicating with at least one peripheral computer. The first appliance 120 is "existing" in the sense that it is not the appliance that is being newly introduced into the network. Peripheral computer 130 is also designated as the network administrator of the appliance based network, meaning that certain decisions are to be made by the user of peripheral computer. The following description describes the peripheral computers as standard computers including microprocessors, user input devices, and user output devices. It should be known that, for the purpose of this invention, the term "peripheral computer" includes other forms of less complex devices including, but not limited to, printers, fax machines, audio speakers, etc.

In embodiments of the invention in which access to the internet is provided, the first appliance 120 can also be connected to the internet 110 via a communication link that preferably provides high speed data transmission. The high speed data communications link efficiently transmits data to and from the internet at a speed that is commensurate with a scenario in which all of the peripheral computers 130, 140, 150 are communicating with the internet at the same time. Appliance-based networks can be configures so that only one appliance needs to be connected to the internet to provide all of the peripheral computers with the ability to communicate over the internet. Therefore, when additional computers are installed to scale or expand the appliance based network, it is not necessary for the additional appliances to be connected directly to the internet.

The distributed appliance based networking environment 100 illustrated in FIG. 1 also includes a second appliance 160 or a newly powered appliance. The second appliance 160 is also referred to as a newly powered appliance because the user is required to do as little as to simply plug the new appliance in to an electrical outlet. The second appliance 160 contains all of the components of the first appliance 120 and, if the user were to so choose, would instead be capable of setting up an entirely different distributed appliance-based networking environment. The purpose of connecting a second appliance to an existing distributed appliance based networking environment is to provide additional features that are not possible in the existing network using only the first appliance 120. These features include, but are not limited to, expansion, mirroring and, in wireless networks, range extension. Expansion, or spanning, is defined as increasing the data storage capacity capabilities of the existing network by providing a second location upon which data can be stored. The increased joint data storage capabilities of the first appliance 120 and the second appliance 160 are utilized in an efficient manner, such as only routing data to the second appliance 160 when the first appliance 120 is full, or only routing large capacity files to the second appliance 160 rather than the first appliance 120. Mirroring is defined as copying all or a specified subset of the data that is stored on the first appliance 120 onto the second appliance 160 to provide a mirror image of the data. By having two copies of the data rather than one, the reliability and security of the data is increased.

In appliance-based network environments that use wireless communication between network components, range extension is defined as placing additional appliances strategically such that the overall wireless range capabilities of a master appliance are expanded. Wireless devices typically have a limited range within which they can communicate with one another. Therefore a master appliance that communicates with peripheral computers over a wireless interface has a limited range which can be extended by adding additional appliances that are still within range of the master but have the capability of wirelessly communicating with peripheral computers outside of the master's range.

The wireless range extension is performed using techniques to avoid undesired network partitioning. For example, the two or more appliances that are used for range extension can communicate with each other to receive network data that has been obtained by either of the appliances, such that all clients have access to the network data associated with other clients, as needed. An additional appliance that is configured to extend the wireless communication range of a master typically also performs other functions, such as mirroring or expansion. As is the case for the other methods of configuring network appliances disclosed herein, the configuration of a network appliance to perform range extension for another network appliance can be automatic and can be performed without user intervention. The term "without user intervention", as used herein, refers to a process that does not require the use to manually select configuration settings in order to initiate operation of the network appliance in the desired manner.

In embodiments that provide range extension for wireless network appliances, the wireless communication can be achieved using any conventional protocol or those that may be developed in the future. For example, the network interface module in the wireless embodiment that supports range extension for wireless network appliances can be an IEEE 802.11 wireless network interface device that enables the appliance to communicate with the peripheral computers over a wireless interface utilizing an IEEE 802.11 data format.

II. Detailed Communicating Sequence

Figure 2:
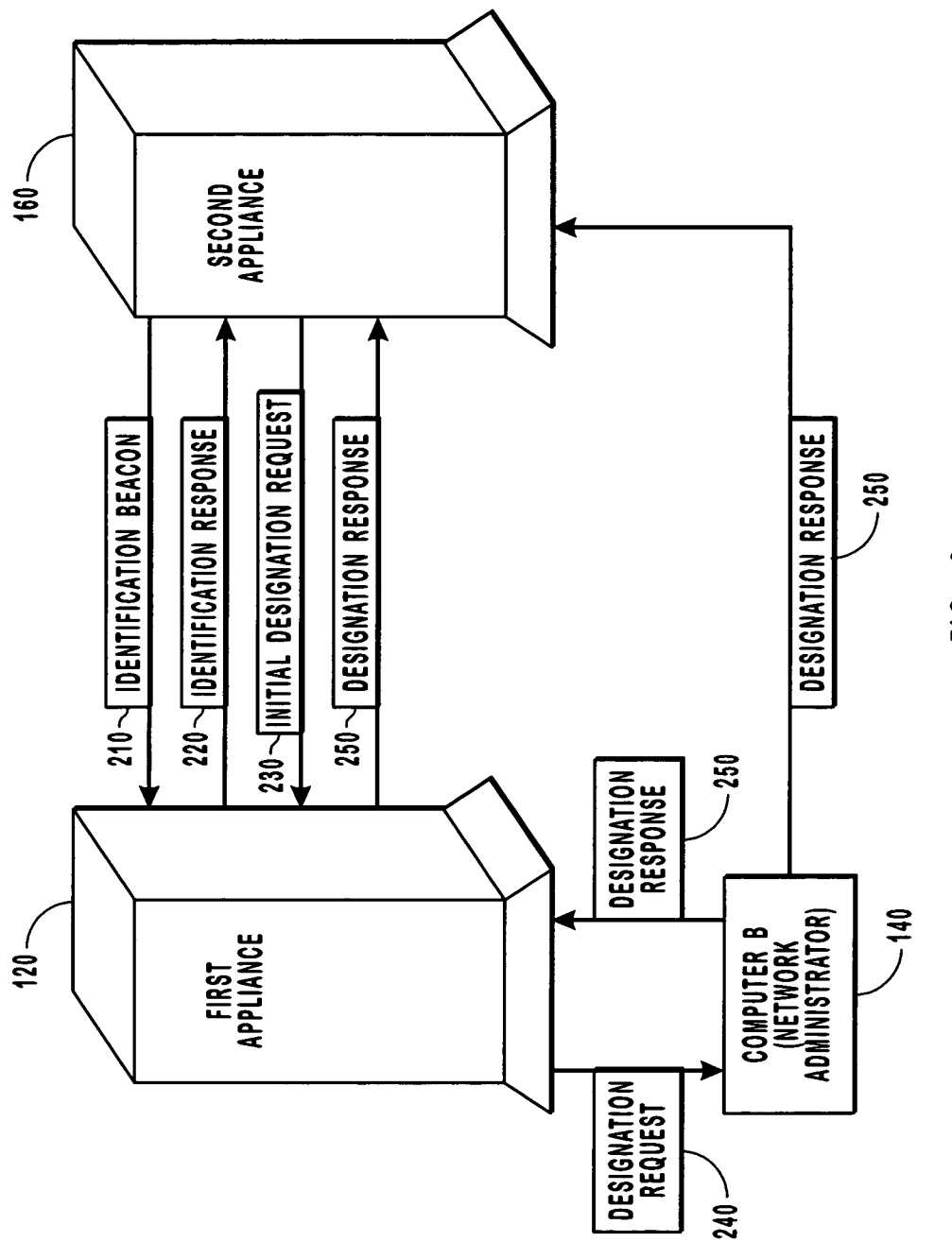
FIG. 2 illustrates a detailed functional block diagram of one presently preferred embodiment of the communications between a first appliance, a newly powered appliance, and a network administrator, that are performed in order to seamlessly incorporate the newly powered appliance into the existing appliance based network.

Reference is next made to FIG. 2, which illustrates a detailed functional block diagram of one presently preferred embodiment of the communications between a first appliance, a newly powered appliance, and a network administrator, that are performed in order to seamlessly incorporate the newly powered appliance into the existing appliance based network and to establish a relationship between the existing network appliance and the new network appliance. When the second appliance 160 (i.e., the newly powered appliance, or the new network appliance) is initially connected to an electrical outlet and is configured to be capable of communicating with other network appliances, it automatically initiates a communication sequence to self configure itself in a manner most efficient for the existing network architecture. Configuration for communication with other network appliances can involve connecting an Ethernet or another appropriate cable for wired devices or, in embodiments that use wireless communication, can involve simply placing the network appliance in transmission range of other wireless components in the network.

This network appliance, when it is introduced into the network, is referred to as a "new network appliance," in the sense that the new network appliance is new to the network into which it has been introduced. First, the second appliance 160 emits an identification signal 210. The identification signal 210 includes the identity of the newly powered appliance and informs other appliances of the fact that the second appliance 160 is now available for operation within the network. In embodiments that use wireless communication, the identification signal 210 is used to determine whether there is another appliance within a specified range.

The identification signal 210 can also be used to transmit information about the second appliance 160 pertaining to a network security scheme. Various security techniques including public key or private key device certification can be used to ensure that the second appliance 160 is properly authorized to connect with the existing appliance based network, which is particularly important in wireless networks. The system can also require the consent of an authorized user who is designated as an administrator in order to add a second appliance 160, which avoids the situation in which an unauthorized person could bring an unauthorized wireless network appliance within operating range of the first appliance. The specified range of the second appliance 160 is based upon the particular wireless data format that is used by the second appliance 160 to transmit the identification signal 210. For example, IEEE 802.11, Bluetooth, and UWB devices all have a particular range within which wireless communications can be transmitted and received, depending on the physical environment in which the wireless appliances are used.

In the environment illustrated in FIG. 1, the first appliance 120 receives the identification signal 210. Upon receiving the identification signal 210, the first appliance 120 transmits an identification response 220 to the second appliance 160. The identification response 220 includes the identity of the first appliance 120 and formally informs the second appliance 160 of the existence of first appliance 120. Upon receiving the identification response 220 from the first appliance 120, the second appliance 160 automatically configures itself to take on the role of slave. Since the first appliance 120 is already managing the network in a master role, it is not necessary for the second appliance 160 to perform the same functions. The role of an appliance determines the manner in which it communicates with other devices, such as other appliances and peripheral computers. The appliance that has a role designation of master generally acts as a router for all communications between the peripheral computers. Each network only requires a single master appliance and therefore all other appliances are designated as slaves. This system ensures that communications are processed in the most efficient manner possible.

As is further shown in FIG. 2, the second appliance 160 transmits an initial designation request 230 to the first appliance 120 upon receiving the identification response 220. The initial designation request 230 indicates that the second appliance has taken on the role designation of slave and seeks a sub-role designation of expansion, mirroring, range extension or any other suitable sub-role that can be performed by the second appliance. Certain sub-roles can be performed together, such as mirroring and range extension. The first appliance 120 then routes the initial designation request 230 to the peripheral computer 140 in the form of a standard designation request 240. Because the peripheral computer 140 has previously been designated as being associated with the network administrator for the network, the first appliance 120 is configured to transmit particular requests to it. The peripheral computer 140 then displays a user prompt requesting the user of the peripheral computer 140 to designate the sub-role of the second appliance 160 as mirroring, expansion, and/or range extension.

A sub-role is a more defined role which should be performed by an appliance with a slave role designation. A slave can take on one or more of any of a variety of sub-roles, specific examples of which include an expansion sub-role, a mirroring sub-role or a range extension sub-role. The definitions of expansion, mirroring, and range extension are discussed above in more detail. The user of peripheral computer 140 then inputs his or her choice through an input device, such as a keyboard or a mouse. The peripheral computer device 140 then generates a designation response 250 which is either transmitted back to the first appliance 120 and routed to the second appliance 160 or directly transmitted to the second appliance 160, both of which are illustrated in FIG. 2. The designation response 250 includes the sub-role designation which is to be assumed by the second appliance 160. Upon receiving the designation response, the second appliance configures itself to act in accordance with the chosen sub-role designation. Alternatively, the identification response includes an automatically generated sub-role designation which the second appliance will then take on without any further initialization communications necessary.

Many of the advantages of the invention are associated with the ability to automatically mirror data of the clients and the self-configuration of appliances that are placed in the operating range of another appliance in the network. When a slave appliance has a mirroring sub-role designation, the mirrored data is useful, for instance, when another computing device in the network fails or experiences data corruption. One example of such failure could be the failure of a master appliance or the loss of data stored in a master appliance. In order to provide ongoing access to the data in the event of such failure, the slave appliance can automatically assume the role of a master appliance upon the detection of the failure of the master appliance or the loss of data in the master appliance. In this manner, the ongoing operation of the network and access to network data can continue in the event of the failure of a master appliance.

III. Distribution of Data in a Multi-Appliance Network

Figure 3:
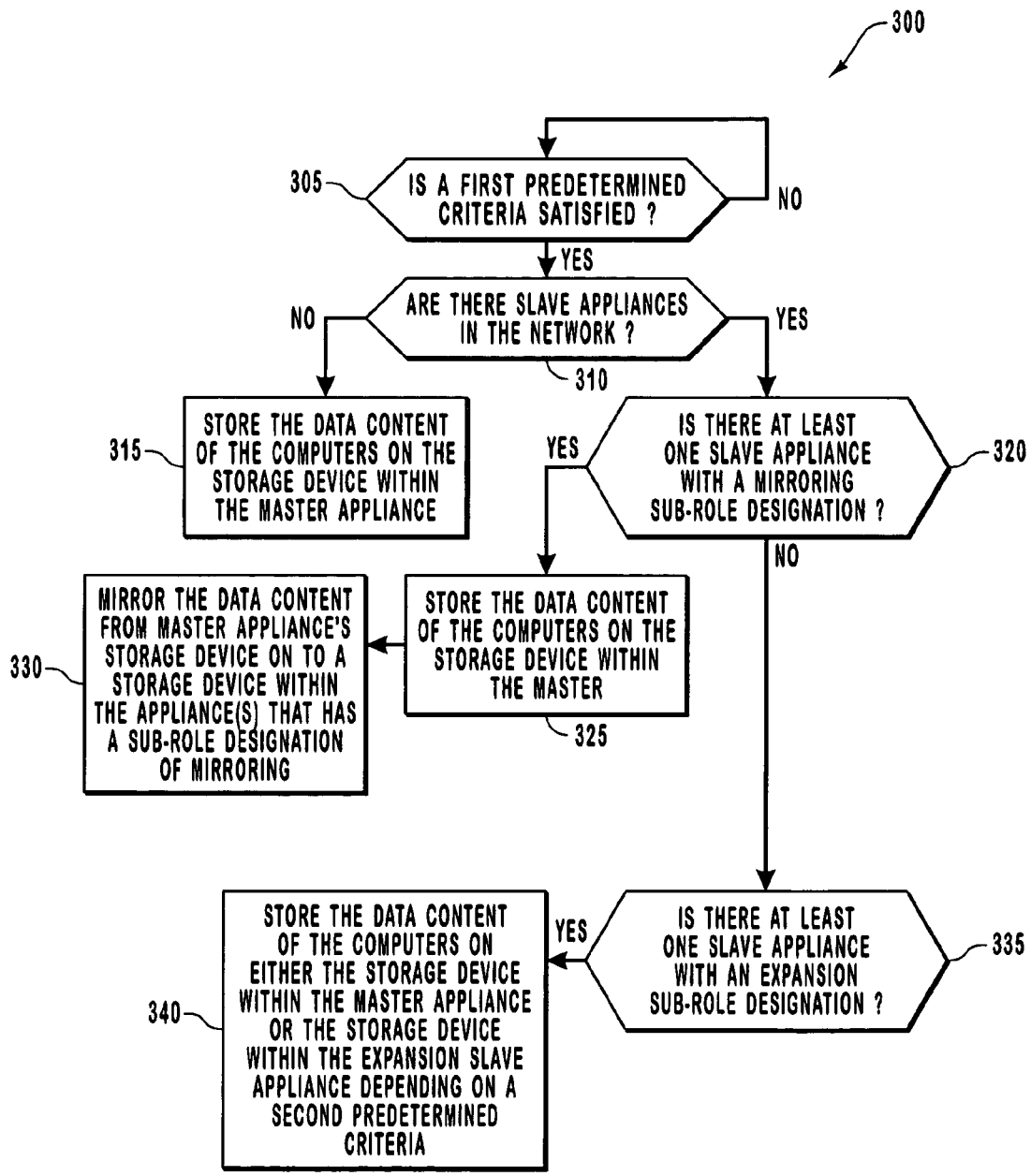
FIG. 3 illustrates a logical flow chart of the analysis performed by a master appliance in determining where to store the data contents from one or more peripheral computers.

Reference is next made to FIG. 3, which illustrates a logical flow chart of the analysis performed by a master appliance in determining where to store the data contents from one or more peripheral computers, designated generally at 300. When there are multiple appliances in a single network, the master appliance determines how to distribute responsibilities. As discussed above, the additional appliance is given a role of slave and one or more sub-roles of, for example, mirroring, expansion, and/or range extension. The illustrated flow chart demonstrates one embodiment of a system by which a master appliance stores the data contents from the peripheral computers onto the multiple appliances in accordance with each of their roles and sub-roles. In this embodiment, The sub-role of range extension does not affect how data is transferred between the master and the one or more slave appliances and therefore the master does not analyze whether a slave appliance includes this sub-role.

The master appliance initially determines, in decision block 305, whether a first predetermined criteria has been satisfied, such that the data content from the computer devices should be copied or stored onto one or more of the appliances. For example, the first predetermined criteria can specify that data from a peripheral computer is to be stored to the master appliance as changes occur in the peripheral computer or periodically with the passage of a specified amount of time. It is noted that different peripheral computers can have independent first predetermined criteria, such that the data content from each of the peripheral computers is stored at different times or in response to different events. Once, the master determines that the first predetermined criteria has been satisfied, it proceeds to determine, according to decision block 310, whether there are any slave appliances in the network. Upon making this determination, the master can store the answer to this inquiry and essentially skip this step in later iterations.

The master can determine if there are slave devices in the network, because the slave devices automatically communicate with the master upon being connected to an electrical power source. If there are no other appliances in the network other than the master, the master proceeds to store the entire data content of the peripheral computer(s) on the storage device within the master appliance in step 315. However, if there are slave appliances present in the network, the master will inquire in decision block 320 whether there is at least one slave appliance with a sub-role designation of mirroring 320. If there is at least one mirroring slave appliance, the master stores the entire content of the peripheral computer(s) on the storage device within the master appliance itself in step 325. The master then mirrors the data stored on the master appliance's storage device onto a storage device within the mirroring slave appliance(s) or instructs a client to mirror the data in step 330.

Alternatively, criteria can be established such that the data content residing on the master appliance storage device is only mirrored to the storage device on the appliance when the criteria is satisfied. By mirroring the data from the master's storage device onto the mirroring slave's storage device at a different time or in response to a different event, it may be possible to provide a greater level of security and isolation for the data content of the mirroring slave's storage device. If there are no slave appliances with a mirroring sub-role designation, the master inquire, in decision block 335, as to whether there is at least one slave appliance with an expansion sub-role designation. If there is an expansion slave appliance, the master stores the data content of the computers on either master appliance's storage device or a storage device within the expansion slave appliance, or a combination of both, depending on a second predetermined criteria in step 340. The second predetermined criteria determines how the master is to distribute the content of the data among multiple storage devices. For example, the master appliance can store all initial data segments within the data on the master appliance's own storage device until the storage device fills up, and then store all remaining data segments from the data content on the storage device within the expansion slave appliance. Alternatively, the master can store all data segments larger than a particular size on the expansion slave appliance's storage device and all remaining data segments on the master appliance's storage device. The various criteria mentioned above can be user defined, in which case they can be updated at any time by a network administrator. While FIG. 3 describes the mirroring decisions and steps as being performed prior to any expansion decisions and steps, the order of these decisions and steps can be reversed.

An additional embodiment of this analytical process can be applied in a situation in which a multi-appliance based network includes both mirroring slave appliances and expansion slave appliances. In such an environment, additional criteria are established to identify the storage devices that a mirroring slave appliance is to mirror. For example, if a multi-appliance based network includes a master, an expansion slave, and two mirroring slaves, it is possible to set up criteria that determine how to partition the data segments of a particular data content between the master and the expansion slave. The two mirroring slaves can then be designated to mirror the contents of either the master or the expansion slave. Alternatively, if the number of mirroring slaves is not one greater than the number of expansion slaves, additional algorithms can be used to identify the data that the mirroring slaves are to mirror.

IV. Exemplary Computing Environment

The following discussion provides a general description of a suitable computing environment in which embodiments of the present invention may be implemented. Although not required, embodiments of the invention may be described in the general context of computer-executable instructions, such as program modules, being executed by computers operating within network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that embodiments of the invention may be practiced in network computing environments with many types of computer system configurations, including personal computers, hand-held devices, mobile telephones, personal digital assistants ("PDAs"), multi-processor systems, microprocessor-based or programmable consumer electronics, network PCs, minicomputers, mainframe computers, and the like. The invention may also be practiced in distributed computing environments where local and remote processing devices are linked (either by hardwired links, wireless links, or by a combination of hardwired or wireless links) through a communications network and both the local and remote processing devices perform tasks.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method comprising:
    transmitting an identification signal from a network appliance that informs at least one other network appliance in a network of the introduction of the network appliance into the network, the identification signal uniquely identifying the network appliance;
    in response to transmitting the identification signal, receiving at the network appliance a designation response, including a specific sub-role designation to be performed by the network appliance; and
    transmitting an initial designation request, including a request for at least one of a mirror sub-role, an expansion sub-role and a range extension sub-role.

2. The method of claim 1, wherein communication between the network appliance and the at least one other network appliance is transmitted over a wireless interface, and wherein transmitting the identification signal is performed to determine whether said at least one other network appliance is within a specified range of the network appliance.

3. The method of claim 2, wherein transmitting an identification signal further includes:
    transmitting an electrical signal between a processor and a wireless interface device;
    converting the electrical signal into a wireless signal; and
    transmitting the wireless signal over an air interface.

4. The method of claim 1 further comprising, receiving at the network appliance an identification response, including an identification of the at least one other network appliance, wherein receiving an identification response further includes configuring to operate in a slave mode role in relation to the at least one other network appliance.

5. The method of claim 1, wherein receiving a designation response further includes configuring to operate in the one or more sub-roles defined in the designation response.

6. A method comprising:
introducing a network appliance to an existing network;
receiving in an existing network appliance an identification signal that includes identification information about the network appliance that has been introduced into the existing network;
receiving an initial designation request, including a request for at least one of a mirror sub-role, an expansion sub-role and a range extension sub-role;
assigning a specific role to be performed by the network appliance; and
transmitting from the existing network appliance a designation response including the specific role to be performed by the network appliance.

7. The method of claim 6, wherein communications between the existing network appliance and the network appliance are performed over a wireless interface, and wherein the identification signal is transmitted by the network appliance to enable the network appliance to determine whether at least one other network appliance is within a specified range of the network appliance.

8. The method of claim 7, wherein receiving an identification signal further includes:
receiving a wireless signal including the identification information;
converting the wireless signal into an electrical signal; and
transmitting the electrical signal between a wireless interface of the existing network appliance and a processor of the existing network appliance.

9. The method of claim 6 further comprising transmitting an identification response, wherein transmitting an identification response further includes configuring to operate in a master mode role in relation to the network appliance.

10. The method of claim 6, wherein the method further includes transmitting a designation request to a network administrator, including a request for at least one of a mirror sub-role, an expansion sub-role and a range extension sub-role for the network appliance.

11. An appliance-based network, comprising:
at least one peripheral computer;
at least one network appliance networked to the at least one peripheral computer; and a new network appliance that is introduced into the network and is capable of networking with the at least one network appliance and the at least one peripheral computer, wherein the new network appliance is configured to automatically initiate a communication sequence with the at least one network appliance using a particular data format, such that the new network appliance is instructed by the at least one network appliance to either mirror data stored in the at least one network appliance or provide additional storage capacity and wherein the new network appliance is assigned a specific sub-role designation, including at least one of a mirror sub-role, an expansion sub-role and a range extension sub-role.

12. The appliance-based network of claim 11, wherein the at least one network appliance, the new network appliance, and the at least one peripheral computer further include network interface devices that enable communication therebetween using a wireless data format.

13. The appliance based network of claim 11, wherein one of the at least one network appliance has a role of master and all other network appliances, including the new network appliance have a role of slave, and wherein all network appliances that have the role of slave have the sub-role designation of at least one of mirroring, expansion, and range extension.

14. In an appliance-based wireless network comprising:
while operating a first network appliance in the wireless network, receiving an identification signal from a second network appliance that has been installed in the wireless network and within a specified wireless range of the first network appliance, the identification signal informing the first network appliance of the existence of the second network appliance;
transmitting a designation request to a network administrator, including a request for at least one of a mirror sub-role, an expansion sub-role and a range extension sub-role for the second network appliance; and
in response to receiving the identification signal, automatically and without user intervention, configuring the second network appliance to perform range extension for the wireless range of the first network appliance and automatically assigning a role of slave to the second appliance.

15. The method of claim 14, wherein configuring the second network appliance comprises:
transmitting an identification response to the second network appliance including identification information about the first network appliance and information about the wireless network; and
transmitting a designation response including instructions for the second network appliance to perform range extension for the first network appliance.

16. The method of claim 14, further comprising transmitting communication between the first network appliance and the second network appliance to avoid network partitioning.

17. The method of claim 16, wherein transmitting communication comprises transmitting between the first network appliance and the second network appliance network data that has been obtained by either the first network appliance or the second network appliance.

18. The method of claim 1, wherein the network appliance is selected from the group consisting of: a router, a gateway, and a data storage device; and the other network appliance is selected from the group consisting of: a router, a gateway, and a data storage device.

* * * * *